United States Patent
Singh et al.

[15] 3,672,442
[45] June 27, 1972

[54] MODULAR AIR CONDITIONING AND HEATING SYSTEM

[72] Inventors: Kanwal N. Singh; Stephen P. Cremean, both of Columbus; Donald R. Scott, Grove City, all of Ohio

[73] Assignee: Columbia Gas System Service Corporation, New York, N.Y.

[22] Filed: Oct. 5, 1970

[21] Appl. No.: 78,116

[52] U.S. Cl. .................................................165/22, 165/50
[51] Int. Cl. ..........................................................F24f 3/00
[58] Field of Search ..............................165/22, 50; 237/19

[56] References Cited

UNITED STATES PATENTS

| | | | |
|---|---|---|---|
| 2,984,460 | 5/1961 | Gardner et al. | 165/50 |
| 3,426,971 | 2/1969 | Meier | 237/19 |

Primary Examiner—Charles Sukalo
Attorney—Curtis, Morris & Safford

[57] ABSTRACT

An air conditioning and heating system for selectively heating or cooling a building while simultaneously heating the water supply for the building has a module adapted to be positioned outside the building, which module contains a boiler for supplying a heated heat transfer medium to first and second heat transfer means within the building, and a water chiller for selectively supplying a chilled heat transfer medium to the first heat transfer means. The air conditioning system includes valve control mechanisms for selectively controlling the supply of heated and chilled transfer mediums to the first heat transfer means to selectively heat and cool air within the building, while the heated heat transfer medium supplied to the second heat transfer means warms the water supply for the building.

15 Claims, 1 Drawing Figure

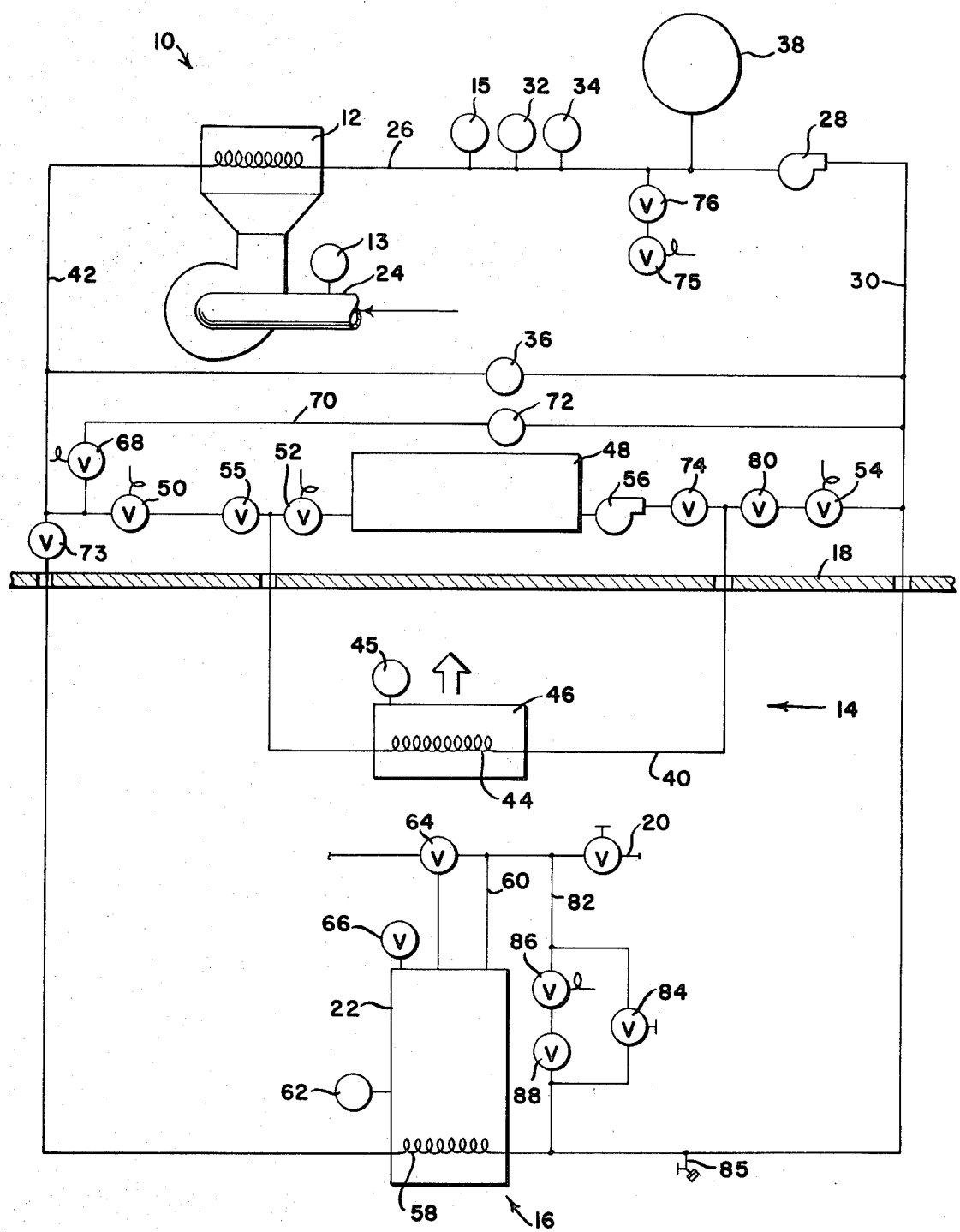

MODULAR AIR CONDITIONING AND HEATING SYSTEM

This invention relates generally to apparatus for air conditioning and water heating, and more particularly to a modular air conditioning and water heating system which is simultaneously adapted to heat the domestic water supply and selectively heat or cool the interior of a building.

In previously proposed air conditioning and water heating systems for domestic use, the air conditioning system is generally a separate and distinct unit from the systems utilized to heat the house and the domestic water supply. As a result, three separate pieces of equipment are often necessary to provide heating and cooling of the house and heating of the water. Typically, a boiler is provided to supply hot water through heat transfer baseboards for heating the home in winter with separate wall air conditioning units or a separate air conditioning duct system operating with a central air conditioning unit in the basement or outside of the home, in addition to a separate boiler for heating the water supply. As a result, substantial space is taken up within the home and there is a duplication of numerous pieces of expensive equipment, as for example the heat transfer coils and the various heat sources required for each separate unit. These components are generally positioned at various locations throughout the basement of the home or other locations therein, thus interfering with the amount of useful area for living space within the dwelling.

Accordingly, it is an object of the present invention to provide a new and improved modular apparatus for conditioning an enclosure and heating domestic water supply thereto.

It is a further object of the present invention to selectively heat or cool an area while simultaneously heating domestic water supply thereto.

It is a still further object of the present invention to selectively cool and heat a building with an integrated air conditioning and heating system located outside the building while simultaneously providing hot water for use within the building.

Yet another object of the present invention is to provide a relatively inexpensive and simply constructed modular air conditioning and water heating system.

In accordance with an aspect of this invention a modular air conditioning and heating system is provided in which a boiler adapted to supply hot water to heat transfer means within a building is mounted in a module that is located outside of the building. A water chiller is also positioned within the module and is adapted to be selectively connected to one of the heat transfer means within the building. Valve mechanisms are provided by which the boiler and the water chiller are selectively connected to one of the heat transfer means in response to a demand for space heating or space cooling. The other of the heat transfer means is continuously in communication with the boiler and forms part of an indirect water heater for heating city water supplied to the building.

The above, and other objects, features and advantages of this invention, will be apparent in the following detailed description of the illustrative embodiment of this invention which is to be read in connection with the accompanying drawing, wherein:

The FIGURE is a schematic representation of an air conditioning and heating system according to one embodiment of the present invention.

Referring to the drawing in detail, it will be seen that an air conditioning and heating system 10 embodying the present invention, as shown therein, includes boiler 12 connected to a boiler circuit having a pair of heat transfer sections 14, 16 connected in parallel. Boiler circuit section 14 is adapted to selectively heat or cool the interior of building 18, whereas boiler circuit section 16 is adapted to heat water supplied from city mains 20 to a water heater 22.

Boiler 12 is preferably a powered blue flame burner having a modulated input, and is located outside of building 18 within a package or module adapted to fully enclose the boiler and other components more fully described hereinafter. Boiler 12 obtains combustion air via duct 24, through which ambient air is drawn from the atmosphere into the boiler for combustion with natural gas to heat a heat transfer medium such as water, propylene glycol, or a mixture thereof. It is noted, that for the sake of clarity, the heat transfer medium heated by boiler 12 is referred to as water, and it is contemplated that this term encompass any other suitable heat transfer medium adapted for use in the present invention.

The water heated within boiler 12 is drawn therefrom through conduit 26 by pump 28 and supplied to conduit 30 to which boiler circuit systems 14 and 16 are connected in parallel. Boiler 12 may be of conventional construction and is adapted to maintain the water supplied thereby at 180° F by modulating the gas and combustion air supplied thereto. When boiler 12 is fired, combustion air is proved by an air flow switch 13 and boiler water flow is also checked by flow switch 15. A high limit temperature switch 32 is connected to the output line 26 to limit the maximum boiler water outlet temperature to approximately 210° F. An additional temperature control 34 is also installed on conduit 26 to prevent boiler water temperature from dropping below approximately 110° F during periods in which there is no demand for heat by either the conditioning system forming part of circuit 14 or the water heating system forming part of circuit 16. Further, a portion of the boiler water flow may be bypassed through a conventional balancing valve 36 to minimize pressure drop within the system.

An expansion tank 38 for boiler water is also provided on conduit 26 to accommodate expansion and contraction of water within the system. Tank 38 may be of either the open or closed type.

Boiler circuit section 14 includes conduit 40 connected between the hot water output line 30 and return line 42 for boiler 12. Conduit 40 includes heat transfer means 44 which preferably comprises a coil member forming part of the conduit and contained within a central air handling module 46 connected to the main duct of a central air distribution system. Module 46 contains a conventional electrically driven blower, an optional electric air cleaner and power humidifier to provide total environmental control.

Heated water from boiler 12 is adapted to flow from pump 28 through conduit 30 into conduit 40 and heat transfer coil 44, and thence to conduit 42, thereby to provide a source of heat within the building at coil 44. The fan within the air handling module draws ambient air from within or without the building, which air is heated by convection as it is passed over coil 44. The fan is provided with a limit switch 45 which delays starting of the fan until water in coil 44 reaches a predetermined temperature thereby preventing cold drafts on start up. Switch 45 also keeps the fan on for a short period after boiler water flow through coil 44 has ceased, in order to remove residual heat. From air handling unit 46, the heated air is supplied through the central air distribution system to distribute the heated air to individual rooms within the building.

A water chiller 48 is connected in parallel with heat transfer coil 44 and is adapted to selectively provide chilled water to the heat transfer coil, in lieu of heated water, in accordance with the demand for space cooling. Water chiller 48 may be a conventional gas absorption type water chiller, which is commercially available, and it is located outside building 18 within the same package or module as boiler 12. To control the selective supply of heated or chilled water to coil 44, electrical valves 50, 52 and 54 are provided. These valves are operably connected to a room thermostat, which, when set for air conditioning, opens valve 52 and simultaneously closes valves 50 and 54. In this condition, chiller 48 is responsive to the demand for space cooling as sensed by the room thermostat and supplies chilled water through pump 56 to conduit 40 and coil 44 in accordance with that demand. Electrical valves 50 and 54 together with check valve 55 prevent heated water from boiler 12 from entering conduit 40 and mixing with the chilled water supplied from chiller 48.

In the air conditioning mode, heated water from boiler 12 is continuously supplied through conduit 30 to boiler circuit section 16. The boiler water is passed through heat transfer coil 58 located in the base of a storage type domestic hot water heater 22. Heater 22 contains water supplied from the city main 20 through conduit 60 and this water is indirectly heated by convection with coil 58. As mentioned above heated water from boiler 12 is supplied at a temperature of approximately 180° F when the boiler is in operation. However, when the system is in the air conditioning mode the operation of the boiler is controlled by a conventional immersion type temperature switch 62 installed in tank 22 to sense the need for hot boiler water whenever domestic water is withdrawn from the tank or when the temperature of the water within the tank decreases below a predetermined level. A conventional adjustable thermostatic mixing valve 64 is also provided, and is connected between city water line 20 and tank 22 to control the temperature of the hot water ultimately supplied to the building. As a safety control, a combination temperature-pressure relief valve 66 is provided on storage tank 22 to vent the tank in the event that failure occurs somewhere in the system and the temperature of the water within the tank reaches 210° F or the pressure exceeds 125 psi.

In addition to electrically controlled valves 50, 52 and 54, electrical valve 68 is provided which is also operably controlled by the room thermostat. Valve 68 is connected in line 70 between lines 30 and 42, and serves as a bypass for hot water supplied from boiler 12. In the air conditioning mode, valve 68 is opened to permit a portion of the boiler water which normally would be used in coil 44 for space heating, in the heating mode, to bypass the air handling module. Balancing valves 72 and 73 may also be provided in lines 70 and 42 respectively.

When there is a demand for space heating, as governed by the wall thermostat within the building, valves 52 and 68 close, and valves 50 and 54 open to permit water from boiler 12 to flow through conduit 40 into coil 44. Closure of valve 52 prevents entrance of boiler water into water chiller 48, on one side thereof, and check valve 74 provided on the other side of chiller 48 prevents boiler water from entering the chiller 48 on that side. In this configuration of the system, hot water is provided to air handling unit 46 and the fan therein flows air from within the building over the coil and distributes the air thus warmed through the central air distribution system to the individual rooms in the home. If the room thermostat does not sense a demand for space heating, electrical valves 50 and 54 close and valve 68 opens. When valve 68 is opened, the boiler water which would be normally used in space heating is bypassed from the air handling unit.

In the space heating mode, boiler 12 is in operation in response to the demand for heat as indicated by the wall thermostat within the home, and boiler water is therefore continuously supplied to indirect water heater 22 and coil 58 even if temperature switch 62 does not sense a demand for heat. Therefore, when boiler 12 is generating hot water, the temperature of the water within storage tank 22 will approach that of the water discharging from boiler 12. However, mixing valve 64 compensates for the added heat by increasing the amount of cool city water supplied from main 20. Further, temperature pressure relief valve 66 guards against inadvertent heating of the water to an excessive extent. When there is no demand for space heating sensed by the wall thermostat, valve 68 opens, as mentioned above, and thence boiler operation is controlled solely by temperature switch 62.

When boiler 12 heats water instead of a mixture of water and propylene glycol or other low freezing point heat transfer mediums, the system is provided with devices for protecting against freezing of the heat transfer medium. One method of protecting the system against freezing is the use of a low temperature control switch such as switch 34, mentioned above, which maintains the boiler in operation to maintain a minimum temperature of the water therein at approximately 110° F, even during the idle periods in the system. However, in the event that there is an electrical power failure in the wintertime additional freeze protection must be provided. To accomplish this end, an electrical valve 75 is provided in conjunction with a thermostatic expansion valve 76. In the event of a power failure, such that current is no longer supplied to valve 75, the valve opens. When boiler water temperature thereafter drops below 60° F or some other predetermined temperature, the thermostatic expansion valve 76 will open to drain the system. Two valves are used in order to provide a time delay in draining the system, so that the system does not immediately drain in the event of a power failure, and a safety margin is provided during which power may be returned to the system. When power is off for a sufficient period of time to drop the temperature of the water to the level indicated, then the system is permitted to drain.

Check valve 80 is provided on conduit 40 to prevent liquid within conduit 40, water chiller 48, and coil 44, from draining from the system when valves 75 and 76 are open.

When initially filling the system, water for boiler 12 is supplied from main 20 to conduit 30 through line 82 and valve 84. Then air is eliminated from all lines by opening valve 84 and purge valve 85. Normally, when the system is filled with water, valve 84 is closed. Supply line 82 is also provided with an electrical valve 86 in parallel with valve 84 and in series with a pressure reducing filling valve 88. Valve 86 remains open during normal operation of the device, and valve 88 permits water to be supplied to the system in accordance with pressure demands within the system itself. In the event of an electrical power failure, such that valves 75 and 76 open to drain the system, valve 86 automatically closes to prevent dumping of city water through the system out of valves 75 and 76.

It is thus seen that a compact and convenient system of space cooling, space heating and water heating is provided by the present invention in compact modular units adapted to be maintained outside of the building. All of the major operational components of the systems are out of the building, thus providing increased space within the housing unit itself.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. Apparatus for air conditioning and heating comprising a first fluid flow conduit forming a closed loop and having a first heat exchanger therein in heat exchange relation with a first fluid medium, a second fluid flow conduit connected to said closed loop in parallel with said first heat exchanger, said second conduit including, a second heat exchanger in heat exchange relation with a second fluid medium, means in said closed loop conduit for supplying heated fluid to said closed loop conduit and through said closed loop conduit to said second conduit, means for selectively isolating said first conduit from said second conduit to selectively prevent heated fluid flow through said second conduit while permitting heated fluid flow through said first closed loop conduit, and means for supplying chilled fluid to said second conduit when said isolating means isolates said first conduit from said second conduit whereby said second heat transfer means in said second conduit is selectively adapted to heat and cool said second fluid medium while said heat transfer means in said first conduit simultaneously heats said first fluid medium as heated fluid is supplied thereto through said first closed loop conduit, independently of the mode of operation of said second conduit.

2. Apparatus as in claim 1 wherein said means for supplying heated fluid to said conduits comprises a gas fired boiler.

3. Apparatus as in claim 1 wherein said second conduit includes a heated fluid intake section and a heated fluid outlet section, and said isolating means comprises individual valve means in each of said sections, said valve means being selectively opened to permit heated fluid flow through said second conduit heat transfer means for heating said second fluid medium and selectively closed to prevent heated fluid flow therethrough for cooling said first fluid medium by means of said chilled liquid.

4. Apparatus as in claim 3 wherein said means for supplying chilled fluid to said second conduit comprises a gas fired fluid chiller.

5. Apparatus as in claim 4 including means for preventing heated fluid flow into said chiller when heated fluid is supplied to said second conduit.

6. Apparatus as in claim 1 including means for bypassing at least a portion of said heated fluid from said first heat exchanger when said first conduit is isolated from said second conduit by said isolating means whereby only a portion of the heated fluid flow passes through said first heat exchanger.

7. Apparatus as in claim 1 wherein said means for supplying heated fluid, and said means for supplying chilled fluid are positioned in a common module, and said second heat transfer means comprises an air handling unit.

8. Apparatus as in claim 7 wherein said module is adapted to be located outside of a building, said air handling unit is located inside said building and said first heat transfer means comprises a hot water heater separate from said means for supplying heated fluid and located in said building.

9. Apparatus as in claim 1 including means for draining said apparatus in response to a loss of power to said apparatus and the temperature of said heated fluid.

10. Apparatus as in claim 9 wherein said draining means comprises first valve means adapted to open in response to said loss of power and second valve means adapted to open in response to a predetermined temperature of said heated fluid.

11. A modular air conditioning and heating system for selectively heating and cooling an area and heating a water supply comprising, a heat transfer medium supply module adapted to be positioned outside said area; first heat transfer means in heat exchange relation with a fluid medium in said area for selectively heating and cooling said area; second heat transfer means in heat exchange relation with said water supply for heating said water supply; a closed loop fluid flow conduit connecting said module to said second heat transfer means, said module including means for supplying a heated heat transfer medium through said closed loop conduit to said first and second heat transfer means, means for supplying a chilled heat transfer medium to said first heat transfer means; and means for selectively controlling the supply of heated and chilled heat transfer mediums to said first heat transfer means, whereby said first fluid medium is selectively heated and cooled while said water is simulatneously heated in both modes of operation by heated heat transfer medium flowing in said closed loop conduit.

12. Apparatus as in claim 11 wherein said means for supplying a heated heat transfer medium comprises a gas fired boiler and said means for supplying a chilled heat transfer medium comprises a gas fired fluid chiller.

13. Apparatus as in claim 12 wherein said selective control means comprises means for selectively isolating said chiller from said first heat transfer means to permit heated heat transfer medium to flow therethrough and means for selectively isolating said boiler from said chiller and said first heat transfer means to permit chilled heat transfer medium to flow therethrough.

14. Apparatus as in claim 13 wherein said first heat transfer means comprises an air handling unit.

15. Apparatus as in claim 14 including means for bypassing at least a portion of said heated heat transfer fluid supplied by said boiler from said second heat transfer means when said boiler is isolated from said first heat transfer means.

* * * * *